(12) United States Patent
Wilcox et al.

(10) Patent No.: US 8,547,796 B2
(45) Date of Patent: Oct. 1, 2013

(54) SEISMIC DATA RECORDING

(75) Inventors: Steven William Wilcox, Kinross (GB); John Christopher Whelan, Ayrshire (GB); Jonathan Alexander, Larbert (GB)

(73) Assignee: Sercel England Limited, Edinburgh (GB)

( * ) Notice: Subject to any disclaimer, the term of this patent is extended or adjusted under 35 U.S.C. 154(b) by 750 days.

(21) Appl. No.: 12/317,135

(22) Filed: Dec. 19, 2008

(65) Prior Publication Data

US 2009/0168602 A1 Jul. 2, 2009

(30) Foreign Application Priority Data

Dec. 28, 2007 (GB) .................................. 0725276.0

(51) Int. Cl.
 *G01V 1/00* (2006.01)
(52) U.S. Cl.
 USPC ............................................................ 367/77
(58) Field of Classification Search
 USPC .................... 367/56, 77, 79; 702/14
 See application file for complete search history.

(56) References Cited

U.S. PATENT DOCUMENTS

| 3,062,315 | A | * | 11/1962 | Herzog ........................... 367/77 |
| 4,236,234 | A | | 11/1980 | McDavid et al. |
| 5,276,655 | A | | 1/1994 | Rialan et al. |
| 5,706,250 | A | * | 1/1998 | Rialan et al. ................... 367/77 |
| 5,724,241 | A | * | 3/1998 | Wood et al. .................... 702/14 |
| 5,822,273 | A | | 10/1998 | Bary et al. |
| 6,002,640 | A | | 12/1999 | Harmon |
| 7,224,642 | B1 | * | 5/2007 | Tran .............................. 367/77 |
| 7,715,887 | B2 | * | 5/2010 | Cloutier et al. ............... 455/574 |
| 7,813,221 | B2 | * | 10/2010 | Barakat et al. ................. 367/76 |
| 2004/0105533 | A1 | | 6/2004 | Iseli |
| 2006/0247505 | A1 | | 11/2006 | Siddiqui |
| 2008/0080311 | A1 | * | 4/2008 | Eperjesi et al. ................ 367/77 |
| 2008/0219094 | A1 | * | 9/2008 | Barakat .......................... 367/21 |
| 2008/0285385 | A1 | * | 11/2008 | Cherry ........................... 367/76 |
| 2009/0234585 | A1 | * | 9/2009 | Ross et al. ..................... 702/14 |
| 2011/0032794 | A1 | * | 2/2011 | Rhodes et al. ................. 367/15 |

FOREIGN PATENT DOCUMENTS

| EP | 0182452 | 5/1986 |
| EP | 0977365 | 2/2000 |
| GB | 2 055 467 | 7/1980 |
| WO | WO2008033969 | 3/2008 |

OTHER PUBLICATIONS

Offshore, vol. 66, No. 11, Nov. 1, 2006, XP002550755 PANASONIC: "Panasonic Introduces next generation Toughbook rugged computers".

* cited by examiner

*Primary Examiner* — Krystine Breier
(74) *Attorney, Agent, or Firm* — Patent Portfolio Builders, PLLC

(57) ABSTRACT

A seismic survey is conducted by positioning an array of remote acquisition units (RAUs) (10). Each of the RAUs (10) records seismic data derived from one or more geophones in digital form in local memory. The data is collected by a harvester unit traversed across the survey territory as by an aircraft (24) using point-multipoint communications, and subsequently transferred from the harvester unit to a central control unit (26).

21 Claims, 4 Drawing Sheets

SEISMIC DATA RECORDING

This invention relates to seismic surveying, and in particular to a method of acquiring seismic data, and to a system for use with such a method.

BACKGROUND TO THE INVENTION

Conventionally, in land seismic surveys, an array of seismic sensors is positioned to detect acoustic signals reflected from earth formations. The seismic sensors may be either analogue geophones or digital accelerometers. The signals from these sensors are input to Field Units where, in the case of analogue geophones, the signal is converted to a high-precision digital sample stream, and where with either type of sensor the digital sample stream is transmitted in real-time over a communications network to a Central Unit to be recorded on bulk recording media. The communications network involved in this process may be a cable-based network with repeaters and battery feeds as required; it may be an entirely cable-free network utilizing wireless techniques to transfer the data; or the network may consist of elements of both cabled and wireless technologies.

A number of disadvantages have been identified with these conventional systems, which has led to the development of a number of land seismic acquisition systems which do not utilize a communications network to transfer the digital sample stream to a Central Unit for recording, but which instead record the data locally in the Field Unit in non-volatile memory. In the normal case, the Field Unit records the data locally for as long as its seismic sensors are required as part of the active sector of the survey. The Field Units are then transported to a Central Unit for connection to a transcription unit and subsequent uploading of the data from the Field Unit to the Central Unit.

The primary advantages proposed for this technique are:
i. Reduction in manpower requirement as no communications infrastructure needs to be deployed
ii. Increased productivity as acquisition is not delayed by faults in a communications network These advantages are mitigated, however, by a number of disadvantages which this invention seeks to address either wholly or in part. These disadvantages are:
i. The non-volatile memory within the Field Unit must be large enough to record all the seismic data acquired while the Field Unit is active on a survey, which may be as long as 14 days in a normal survey, but in exceptional cases may be much longer and may be indeterminate.
ii. It is normally the case that the Field Unit must be transported to a data transcription system which will be used to transfer all the acquired seismic data to the Central Data Recorder.
iii. The seismic data acquired during the survey will not be available for examination until all the Field Units have been transcribed as described in ii above, which may be as much as 14 days after the start of the survey, involving substantial risk that poor quality data may be acquired before there is an opportunity to detect it.
iv. There is a risk that Field Units may malfunction, be stolen, or be misplaced during the survey involving the loss of all the data acquired by them.
v. Substantial field crew effort is required to transport the Field Units to the transcription system in a timely manner, which impacts on the productivity of the survey.
vi. Unforeseen circumstances, such as bad weather conditions, may delay transportation of the Field Units to the transcription system, causing further delays to the processing of the data.

SUMMARY OF THE INVENTION

The invention, in one aspect, provides a method of uploading seismic data from multiple remote acquisition units positioned across a survey area, each remote acquisition unit storing seismic data from one or more geophones, the method comprising traversing a harvester unit across the survey area, the harvester unit including or being accompanied by a point-multipoint transceiver, and uploading the seismic data from each of the remote acquisition units as the harvester unit passes within range, seismic data passing from more than one remote acquisition unit to the harvester unit simultaneously where necessary.

Preferably, the seismic data stored and transmitted by each of the remote acquisition units includes timestamp information relating to the relevant seismic event. The timestamp information may suitably be derived at the remote acquisition unit from an independent remote source such as GPS or terrestrial radio time signals.

The harvester unit may traverse the survey area in a vehicle such as an aircraft, vessel, ground-effect vehicle, or all-terrain wheeled or tracked vehicle.

Seismic data is preferably compressed by a lossless compression algorithm before being transmitted by the remote acquisition unit.

Preferably, each of the remote acquisition units is programmed to periodically search for the presence of an access point, the remote acquisition unit reverting to an energy-saving state in the absence of an access point.

From another aspect the invention provides a method of conducting a seismic survey, comprising positioning an array of remote acquisition units across a survey area, connecting one or more seismic sensors to each of the acquisition units, performing one or more seismic events and storing resulting seismic data from the seismic sensors in the remote acquisition units, and uploading the stored data by the foregoing method.

Preferably, before data is acquired, each of the remote acquisition units is configured with parameters defining working hours and optionally one or more of sample interval, amplifier gain and filter characteristics.

Each remote acquisition unit may be arranged to transmit to the harvester unit only data relating to a start time and number of samples as defined in a signal from the harvester unit to the remote acquisition unit.

Optionally, the harvester unit extracts and transmits a limited data set (such as battery status, sensor status, and position) from each remote acquisition unit for receipt by a central control unit during passage of the harvester unit across the survey area.

The seismic survey method preferably includes the further step of uploading seismic data from the harvester unit to a central unit, for example by transporting the harvester unit to the central unit and downloading via cable connection, or by downloading from the vehicle remotely to the central unit over a wireless data connection.

A further aspect of the present invention provides a seismic data acquisition system comprising:
multiple remote acquisition units deployed in an array across a survey area;
each of the remote acquisition units being in communication with one or more geophones and including storage means for storing seismic information from said geophone(s) in digital form, and each of the remote acquisition units including a transceiver adapted to operate in a point-multipoint wireless system;

whereby stored seismic data may be transmitted from the multiple remote acquisition units to a point-multipoint transceiver of a harvester unit as the latter is traversed across the survey area.

The storage means in each of the remote acquisition units is most suitably a non-volatile memory.

Preferably, each of the remote acquisition units is adapted to associate a timestamp with a given set of seismic data, the timestamp being derived from a timing signal received by wireless from a central unit, or from GPS timing information.

The system typically includes a harvester unit with an associated point-multipoint transceiver in a portable form capable of traversing the survey area.

The harvester unit may be mounted in a vehicle such as helicopter, light aircraft, either manned or remote controlled (UAV). Including microlight and other "experimental" aircraft, un-tethered blimp, either remote controlled or piloted, boat, including air-boats of the type typically used in swamps and marshland, hovercraft, or motor vehicle, including pickup truck, all-terrain vehicles and quads; or in a backpack for pedestrian use.

The invention in another aspect provides harvester unit for use in the above method or system, comprising a ruggedised field portable computer operably coupled with a power source, a bulk storage memory, and point-multipoint communication access point and an antenna, all of the foregoing forming a transportable package suitable for being traversed across a seismic survey terrain.

DETAILED DESCRIPTION

An embodiment of the invention will now be described, by way of example only, with reference to the drawings, in which.

Figure 1:
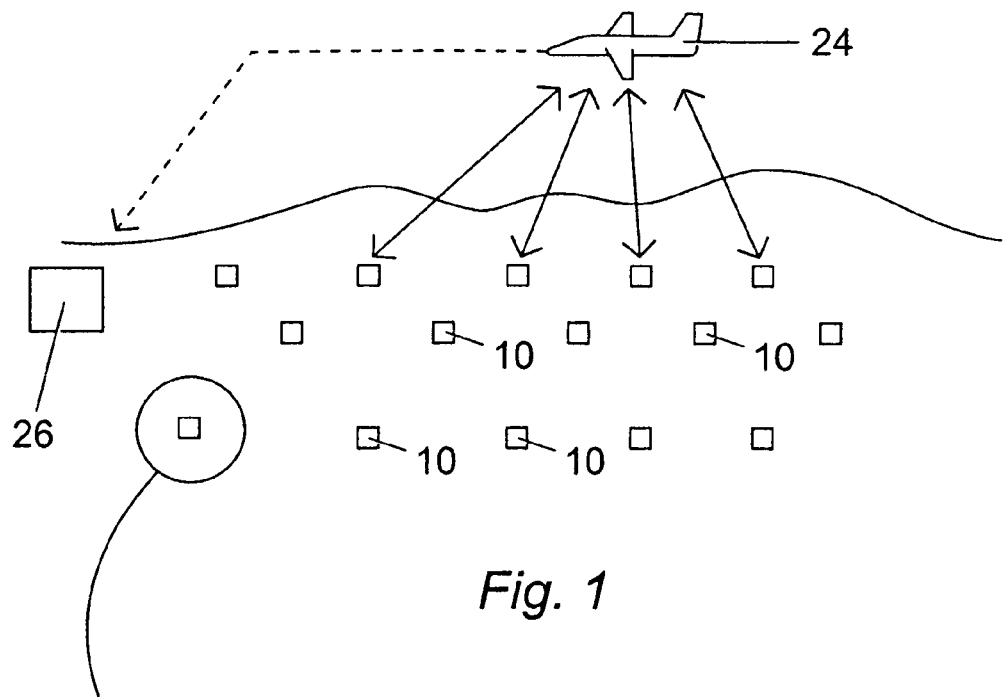
FIG. 1 is a schematic overview illustrating one embodiment of the invention.
Figure 2:
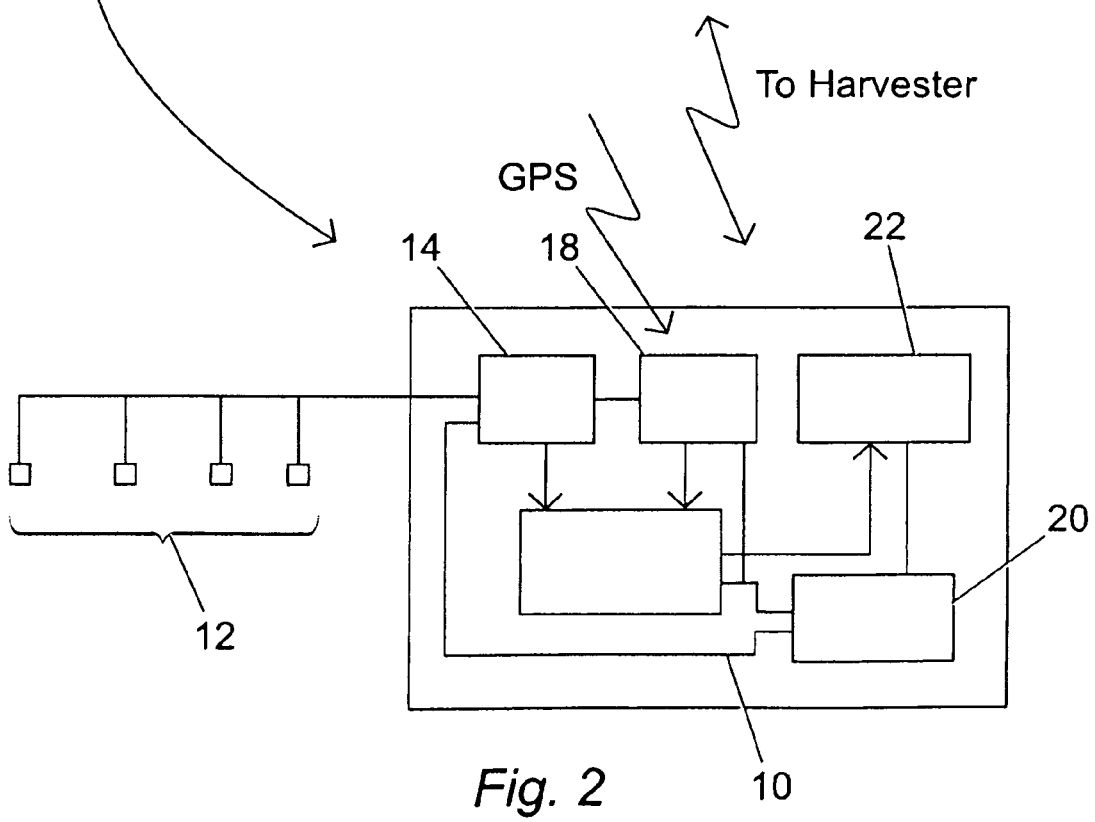
FIG. 2 shows one part of FIG. 1 in greater detail.

Referring to FIG. 1, in carrying out a seismic survey, an array of Field Units or Remote Acquisition Units (hereinafter RAUs) 10 is arranged across a territory of interest. As seen in FIG. 2, each RAU 10 is connected to one or more geophones 12.

Referring also to FIG. 2, each of the RAUs comprises an analog-to-digital converter 14 (in the case of analog geophones), and a memory 16. The AD converter 14 performs a high-precision, 24-bit analogue-to-digital conversion on the sensor signal. The memory 16 is suitably a non-volatile memory such as a hard disc drive or a flash memory. The RAU 10 also comprises a time reference means 18 which in a preferred form is a GPS receiver capable of deriving an accurate time reference from GPS transmissions; however in principle other sources of time reference may be used, such as an accurate internal clock or a receiver for terrestrial time radio signals. The RAU 10 is self powered by an internal source such as battery 20, and also comprises a transceiver 22 adapted to operate in a point-multipoint system. The wireless transceiver 22 is preferably compliant with the IEEE802.11 family of wireless standards particularly the IEEE802.11b, IEEE802.11g, IEEE802.11a, and IEEE802.11n standards operating in the 2.4 GHz or 5.8 GHz frequency bands; however other transceivers such as Ultra Wide Band devices, Bluetooth devices, VHF devices, UHF devices operating in the 900 MHz, 2.4 GHz, 5.8 GHz, 60 GHz, 150 MHz-174 MHz, 400 MHz-470 MHz frequency bands, or other frequency bands, whether compliant with standards such as IEEE802.15 or using proprietary protocols may also be used.

Reverting to FIG. 1, the RAUs 10 operate autonomously to acquire and store seismic information which is subsequently captured by a harvester unit 28 which is traversed across the geophone territory, for example in an aircraft 24, all the data thus retrieved being subsequently transferred from the harvester unit 28 to a central unit 26. This process is described in more detail below.

The central unit 26 performs two functions. First, it is used to configure the RAUs 10, as discussed below. Secondly, the central unit 26 uploads the seismic data, processes and merges it with any requisite data from its source control database and generates seismic trace data in an SEG (Society of Exploration Geophysicists) compatible format.

Figure 3:
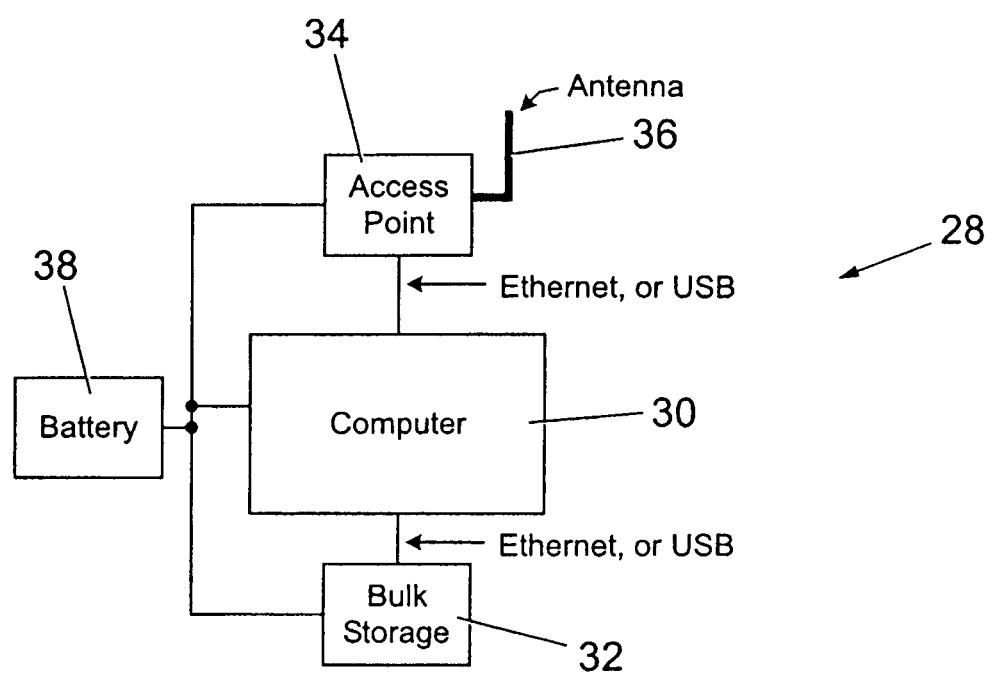
FIG. 3 is a block diagram of a harvester unit 28 used in the system of FIG. 1.

FIG. 3 illustrates the harvester unit 28, which comprises the following components:

A portable, field-rugged, battery-powered computer 30 loaded with the required software A high capacity bulk data storage device 32 either incorporated in the computer 30 or connected to it externally A wireless access point 34 connected to the computer and compatible with the wireless transceivers 22 incorporated into the RAUs. This should preferably communicate with the computer 30 using one of the following methods: wired Ethernet; USB; wireless, where the computer has a compatible wireless transceiver fitted internally.

An antenna 36.

Optionally, a battery-pack (38) to power these components. In some instances the vehicle power system may be used to supply power instead.

A mounting kit (not shown) to fit the above components to the vehicle used to transport the harvester unit 28.

The process of recording is subject to a configuration procedure which can take place either before the RAUs 10 are deployed or subsequent to deployment. The RAUs 10 are connected by means of a cable or by a wireless link to a computer from where operating parameters of the RAUs are configured. These parameters are the sample interval and working hours, and optionally amplifier gain (analogue only) and filter characteristics (that is, characteristics of filtering applied to the seismic signal before being recorded). The working hours parameter determines the times of day during which the RAU 10 acquires and records data from its sensors 12; at other times the RAU 10 enters a mode whereby power consumption is reduced to an absolute minimum. The other parameters relate to the manner in which the seismic data is acquired from the sensors.

While the RAUs 10 are acquiring and recording data, they periodically switch on the internal wireless module 22 and search for a wireless access point which is transmitting a correct service set identifier. If no such transmitting access point is detected, the wireless module 22 is switched off for a certain period of time, after which a renewed search will take place. The length of time that the wireless module 22 is switched off is optimized in order to reduce the overall power consumption of the RAU 10, while maintaining an acceptable response time in the presence of a valid access point.

It will thus be seen that the RAUs 10 acquire seismic data during the configured working hours and store this data in non-volatile memory 16 together with associated timestamp information derived from timing means 18. This happens autonomously, without any communication with the central unit 26. The stored data is subsequently collected by the harvester unit 28 whenever the access point of the harvester unit 28 is identified by the RAU 10.

The above procedure allows the field crew to be able to retrieve recorded seismic data from the RAUs 10 by the method described below.

The seismic field crew is equipped with the harvester unit 28 of FIG. 3. The wireless access point 34 acts as a point-multipoint wireless access point compatible with the transceivers 22 in the RAUs 10, and transmits a service set identifier which the RAUs 10 will recognize as valid.

The field crew connects the harvester unit 28 to the central unit 26 from where the entire seismic operation, including control of the seismic sources is undertaken. The central unit 26 transfers a list to the computer 30 containing the precise start time, and number of samples, of every seismic record of interest to be recorded. This precise start time is hereafter referred to as the timebreak.

The field crew then proceeds across the prospect with the harvester unit 28, which establishes communications with RAUs 10 as it comes within wireless range of them. When a communications link is established, the harvester unit 28 transfers the timebreak and number of samples required for each record to the RAU 10, which then transmits the required recorded data to the harvester unit 28.

Figure 4:
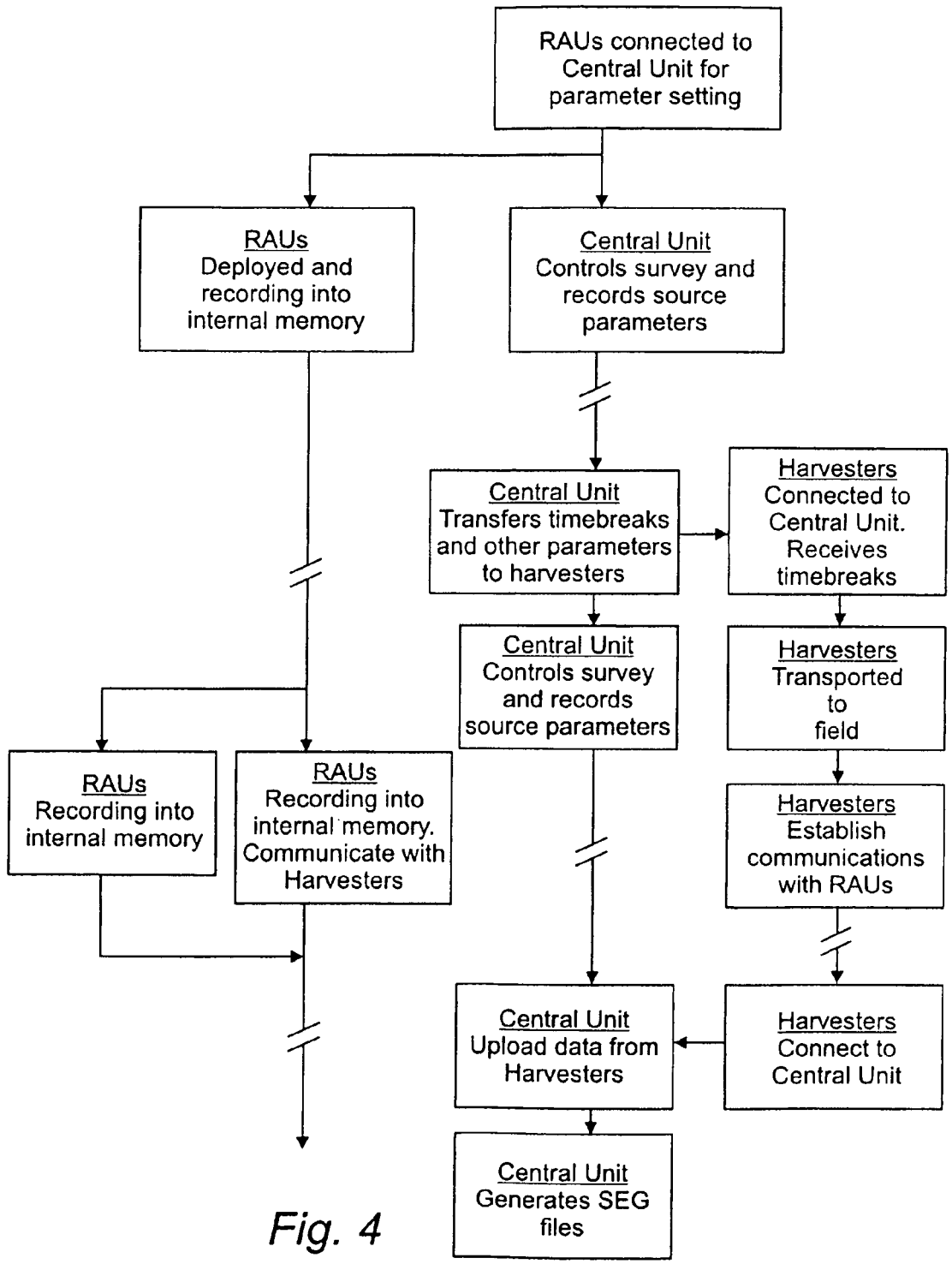
FIG. 4 is a flow chart illustrating the operating method of the embodiment.

The method of the present embodiment is illustrated in FIG. 4.

The point-multipoint wireless access point 34 in the harvester unit 28 may communicate with multiple RAUs 10 simultaneously, limited by wireless transmission range, vegetation and topology; however, also limited by the harvester software which is configured with a maximum limit of RAU connections to optimize the wireless data throughput.

The data throughput may be further optimized by the use of a lossless compression algorithm to reduce the actual amount of data transferred. Various forms of lossless data compression are well known and may be used here. However, a particularly suitable form of compression is described in WO03079039 (A2).

In the harvester unit 28, the data retrieved from the RAUs 10 is stored in the local bulk storage 32 such as a hard disk drive. After the harvester unit 28 has traversed the survey area, the harvested data is transferred to the central unit 26 by any suitable means, for example by transporting the harvester unit 28 to the central unit 26 and downloading via cable connection, or by downloading from the vehicle remotely to the central unit 26 over a wireless data connection.

Figure 5:
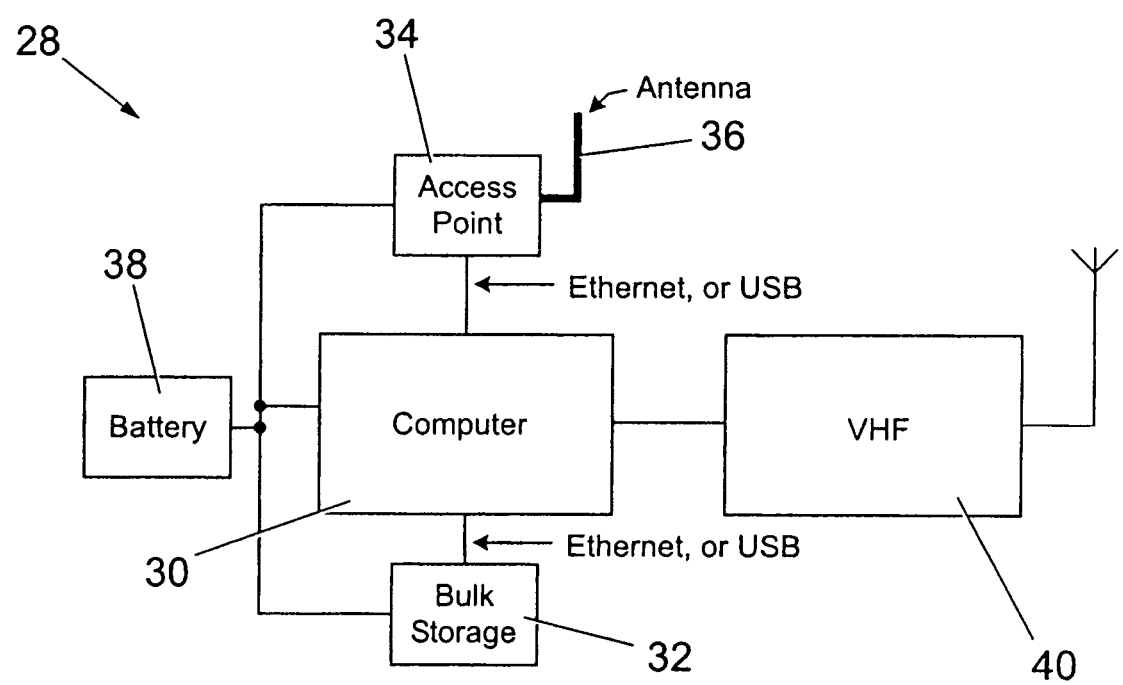
FIG. 5 illustrates a modified embodiment.

In a modification, shown in FIG. 5, the harvester unit 28 is additionally provided with a radio link such as VHF or UHF transceiver 40 which is capable of effecting communication at a relatively low rate with the central control unit 26 (as indicated by dashed line in FIG. 1). As the harvester unit 28 is traversed across the survey terrain the seismic data is harvested and stored as before. In addition, however, the harvester unit 28 derives from the RAUs information which may be referred to as quality control (QC) data and transmits this to the central control unit 26 in real time.

The QC information will typically be battery power level and the status of the RAU, plus optionally a GPS-derived position of the individual RAU. This will typically amount to a few kilobits of information, which can be transmitted over a simple VHF link in real time. The status of the RAU will typically be a simple yes/no indication that the seismic sensor is working, for example that the correct number of geophones are connected, or that a digital sensor has passed a built-in test sequence.

This modification allows the central control unit to have very quickly some basic information about each of the RAUs, particularly the fact that it is operational and is acquiring seismic data. If the proportion of inoperative or defective RAUs exceeds a predetermined threshold, the relevant part of the seismic survey can be ignored or aborted without transferring and analyzing large amounts of data.

The harvester unit 28 may be transported across the prospect by a number of different means, examples of which are given below.

1. Helicopter
2. Light aircraft, either manned or remote controlled (UAV). Including microlight and other "experimental" aircraft
3. Un-tethered blimp, either remote controlled or piloted
4. Boat, including air-boats of the type typically used in swamps and marshland
5. Hovercraft
6. Motor vehicle, including pickup truck, all-terrain vehicles and quad bikes
7. Backpack for pedestrian use.

It will be noted that in the present invention the RAUs operate in an "autonomous" mode, and perform the functions of data capture, storage and forwarding without any interaction with a Central Control Unit, relying on preconfigured parameters for pre-amplifier gain, sample interval and other relevant settings. In this mode, timing synchronization is provided by a GPS receiver or a radio timing signal, and thus also without any interaction with the Central Control Unit.

Point-multipoint transceivers suitable for use in the invention are known per se. The data transfer rate typically required between the RAU and the harvester unit 28 is 11 Mbits/sec, and an example of a suitable point-multipoint transceiver for this application is the Abicom Freedom CPE by Abicom International of Market Drayton, Shropshire.

The invention thus provides a method and system which minimises the labour involved in setting out a survey, makes retrieval of the seismic data more convenient, and can operate with relatively limited memory capacity in the RAUs owing to the ease of harvesting.

The invention claimed is:

1. A method of transferring data during a seismic survey, from remote acquisition units to a central control unit, the method comprising:
   positioning an array of the remote acquisition units across a survey area,
   positioning plural seismic sensors across the survey area,
   connecting, after positioning the array of the remote acquisition units and after positioning the plural seismic sensors, one or more seismic sensors of the plural seismic sensors to corresponding remote acquisition units,
   performing one or more seismic events and storing resulting seismic data from the seismic sensors in the corresponding remote acquisition units, the seismic data stored by the corresponding remote acquisition units including timestamp information relating to the relevant seismic event, in which the timestamp information is derived at the remote acquisition unit from an independent remote source,
   wirelessly uploading data into a harvester unit by traversing the harvester unit across the survey area, the harvester unit including or being accompanied by a point-multipoint transceiver, wirelessly uploading the data from the remote acquisition units directly into the harvester unit as the harvester unit passes within range, the data passing from more than one remote acquisition unit to the harvester unit simultaneously where necessary, and wirelessly transferring the data from the harvester unit to the central control unit during the seismic survey, wherein the remote acquisition units operate in an autonomous mode while capturing, storing and forwarding the seismic data.

2. The method of claim 1, in which the harvester unit traverses the survey area in a vehicle such as an aircraft, vessel, ground-effect vehicle, or all-terrain wheeled or tracked vehicle.

3. The method of claim 1, in which seismic data is compressed by a lossless compression algorithm before being transmitted by the remote acquisition unit.

4. The method of claim 1, in which each of the remote acquisition units is programmed to periodically search for the presence of an access point, the remote acquisition unit reverting to an energy-saving state in the absence of an access point.

5. The method of claim 1 in which, before data is acquired, each of the remote acquisition units is configured with parameters defining working hours and optionally one or more of sample interval, amplifier gain and filter characteristics.

6. The method of claim 5, in which each remote acquisition unit wirelessly transmits to the harvester unit data relating to a start time and number of samples only as defined in a signal from the harvester unit to the remote acquisition unit.

7. The method of claim 1, in which the harvester unit extracts and wirelessly transmits a limited data set (such as battery status, sensor status, and position) from each remote acquisition unit for receipt by the central control unit during passage of the harvester unit across the survey area.

8. The method of claim 1, including the further step of uploading seismic data from the harvester unit to a central unit, for example by transporting the harvester unit to the central unit and downloading via cable connection, or by downloading from the vehicle remotely to the central unit over a wireless data connection.

9. A seismic data acquisition system comprising:
multiple remote acquisition units deployed in an array across a survey area;
plural geophones positioned across the survey area;
the remote acquisition units being connected to one or more geophones of the plural geophones and including storage means for storing seismic data from said geophone(s) in digital form, the seismic data stored by the remote acquisition units including timestamp information relating to the relevant seismic event, in which the timestamp information is derived at the remote acquisition unit from an independent-remote source, and at least one of the remote acquisition units including a transceiver adapted to operate in a point-multipoint wireless system;
a harvester unit with an associated point-multipoint transceiver in a portable form capable of traversing the survey area;
whereby data may be wirelessly transmitted directly from the multiple remote acquisition units to the point-multipoint transceiver of the harvester unit as the harvester unit is traversed across the survey area; and
a central control unit wirelessly connected to the harvester unit and configured to wirelessly receive the data from the harvester unit,
wherein the remote acquisition units operate in an autonomous mode while capturing, storing and forwarding the seismic data.

10. The system of claim 9, in which the storage means in each of the remote acquisition units is a non-volatile memory.

11. The system of claim 9, in which at least one the remote acquisition units is adapted to associate a timestamp with a given set of seismic data, the timestamp being derived from a timing signal received by wireless from a central unit, or from GPS timing information.

12. The system of claim 9, in which the harvester unit further includes a radio transmitter adapted to transmit to a central control unit a limited data set (such as battery status, sensor status, and position) from each remote acquisition unit during passage of the harvester unit across the survey area.

13. The system of claim 9, in which the harvester unit is mounted in a vehicle such as helicopter, light aircraft, either manned or remote controlled (UAV), including microlight and other "experimental" aircraft, un-tethered blimp, either remote controlled or piloted, boat, including air-boats of the type typically used in swamps and marshland, hovercraft, or motor vehicle, including pickup truck, all-terrain vehicles and quads; or in a backpack for pedestrian use.

14. The method of claim 1, wherein the data includes quality control data and the quality control data is used to determine whether to wirelessly transfer the seismic data to the central unit.

15. The method of claim 1, further comprising:
based on quality control data wirelessly transmitted by the harvester unit to the central control unit, determining in the central control unit if a proportion of inoperative or defective remote acquisition units exceeds a predetermined threshold; and
ignoring seismic data corresponding to the inoperative or defective remote acquisition units.

16. The method of claim 1, further comprising:
based on quality control data, determining in the central control unit if a proportion of inoperative or defective remote acquisition units exceeds a predetermined threshold; and
instructing the mobile harvester unit to abort transferring seismic data corresponding to the inoperative or defective remote acquisition units.

17. The system of claim 9, wherein the data includes quality control data and the quality control data is used to determine whether to wirelessly transfer the seismic data to the central unit.

18. The system of claim 9, wherein the central control unit determines, based on quality control data wirelessly transmitted by the harvester unit to the central control unit, if a proportion of inoperative or defective remote acquisition units exceeds a predetermined threshold; and ignores seismic data corresponding to the inoperative or defective remote acquisition units.

19. The system of claim 9, wherein the central control unit determines, based on quality control data, whether a proportion of inoperative or defective remote acquisition units exceeds a predetermined threshold; and instructs the mobile harvester unit to abort transferring seismic data corresponding to the inoperative or defective remote acquisition units.

20. A seismic data acquisition system comprising:
plural seismic sensors distributed across a survey area;
multiple remote acquisition units deployed in an array across the survey area, the remote acquisition units being connected to one or more seismic sensors after being deployed and including a storage unit for storing seismic data from the seismic sensors, the seismic data stored by the remote acquisition units including timestamp information relating to a relevant seismic event, in which the timestamp information is derived at the remote acquisition unit from an independent-remote source;

a mobile harvester unit having an associated point-multipoint transceiver, wherein data may be wirelessly transmitted directly between the multiple remote acquisition units and the point-multipoint transceiver of the harvester unit as the harvester unit is traversed across the survey area;

the mobile harvester unit also having a radio transceiver that wirelessly communicates with a central control unit; and a central control unit wirelessly connected to the harvester unit and configured to wirelessly receive from the radio transceiver of the mobile harvester unit quality control data in real time as the mobile harvester unit traverses the survey area and while the multiple remote acquisition units record the seismic data, wherein the quality control data characterizes a status of one or more of the multiple remote acquisition units.

21. The system of claim 20, wherein the central control unit sends the mobile harvester unit a list with operating instructions for the multiple remote acquisition units and the mobile harvester unit transfers the list to the multiple remote acquisition units when communication is established between the mobile harvester unit and the multiple remote acquisition units.

* * * * *